United States Patent [19]

Briggs et al.

[11] Patent Number: 5,333,221

[45] Date of Patent: Jul. 26, 1994

[54] UNIVERSAL ADAPTER FOR OPTICAL CONNECTORS

[75] Inventors: Robert C. Briggs, Newport; Thomas R. Fawcett, Jr., Mechanicsburg; Denis G. Mulholland, Lancaster; Steven P. Owens, Grantville; Wallace R. Savitsky, Harrisburg, all of Pa.

[73] Assignee: The Whitaker Corporation, Wilmington, Del.

[21] Appl. No.: 906,784

[22] Filed: Jun. 30, 1992

[51] Int. Cl.⁵ ............................................. G02B 6/36
[52] U.S. Cl. ...................................... 385/55; 385/59; 385/71
[58] Field of Search ................ 385/53, 55, 56, 58, 385/59, 70, 71, 76, 77, 88, 89, 92

[56] References Cited

U.S. PATENT DOCUMENTS

| | | | |
|---|---|---|---|
| 4,303,304 | 12/1981 | Ruiz | 385/85 |
| 4,753,510 | 6/1988 | Sezerman | 385/66 |
| 4,805,980 | 2/1989 | Mackenroth | 385/72 |
| 4,902,094 | 2/1990 | Shank | 385/55 |
| 4,979,792 | 12/1990 | Weber et al. | 385/53 |
| 5,042,891 | 8/1991 | Mulholland et al. | 385/93 |
| 5,073,042 | 12/1991 | Mulholland et al. | 385/69 |
| 5,074,637 | 12/1991 | Rink | 385/56 |
| 5,082,344 | 1/1992 | Mulholland et al. | 385/60 |
| 5,117,476 | 5/1992 | Yingst et al. | 385/88 |
| 5,142,597 | 8/1992 | Mulholland et al. | 385/56 |
| 5,166,995 | 11/1992 | Briggs et al. | 385/58 |

Primary Examiner—Frank Gonzalez
Attorney, Agent, or Firm—Katherine A. Nelson; Driscoll A. Nina, Jr.

[57] ABSTRACT

A universal adapter including a generic fixed housing (10) capable of receiving diverse back panel assemblies (20-1, 20-2 ... 20-n) each having a set of coupling elements (22-1, 22-2 ... 22-n) which may differ according to industry standards. The adapter facilitates optical coupling of, for example, a Fiber Distributed-Data Interface (FDDI) style connector or an ESCON ™ style connector with either an SC ™ style connector, an ST ™ style connector, an FC style connector, or any other type of optical connector.

7 Claims, 6 Drawing Sheets

UNIVERSAL ADAPTER FOR OPTICAL CONNECTORS

FIELD OF THE INVENTION

The present invention relates to fiber optic connectors and, more particularly, to a universal adapter including interchangeable back panels with different coupling assemblies for mating duplex fiber optic plugs to connectors of different configurations.

BACKGROUND OF THE INVENTION

Advances in fiber optic interconnection technology have opened numerous and diverse commercial applications. Industry standards and conventions have evolved along with the technology, and these standards govern optical systems to some extent. Nevertheless, each new fiber optic application comes with unique requirements, and existing optical system components must be adapted accordingly. It follows that there is a strong need for more flexible components which can accommodate a variety of applications.

However, a three-way balance arises between the above-described need for flexibility, an equally important need for economy, and an overriding need to comply with industry standards.

Prior attempts to strike the proper balance have resulted in a variety of "universal" optical components which may be adapted to different applications.

For example, in U.S. Pat. No. 4,979,792 issued to Weber et al., a connector is disclosed with interchangeable keying elements to allow field keying to the correct plug assembly. U.S. Pat. No. 5,117,476 issued to Yingst et al., discloses an optical package including a receptacle shell having a field keying system. Keying means such as the ones described in the patents eliminate the risk of connecting an improper plug to the receptacle when numerous identical plugs and receptacles exist.

Even more flexibility and economy could be achieved by an adapter which facilitates mating of a variety of optical plugs with different receptacles, for instance, plugs and receptacles having different configurations and/or conforming to different industry standards. When combined with the field keying feature disclosed in Weber et al. '792, the resulting "universal" connection capability would be extremely useful in optical systems which adhere to different connector conventions.

However, industry and design standards require optical transmission accuracy and low signal losses, and these qualities are easily compromised in a universal-type connector. Specifically, transmission accuracy is decreased and signal losses are increased by non-precision alignment of the optical fibers which are joined at the connector. Such misalignment may occur initially at assembly, or it may result from subsequent instability in the field.

Past attempts at universal-type connectors have too often sacrificed quality and stability of optical fiber alignment. Consequently, a clear commercial need exists for an adapter which mates optical fiber plugs with dissimilar receptacles.

SUMMARY OF THE INVENTION

It is, therefore, an object of the present invention to provide economical universal optical connection capabilities with a generic adapter capable of mating dissimilar optical connectors.

It is another object of the present invention to provide an optical adapter as described above in which precise alignment of two optical fibers can be achieved and maintained.

It is a further object of the present invention to provide an adapter with interchangeable back coupling panels designed to maximize lateral and vertical stability without the need for excessive insertion force.

It is a specific object of the present invention to provide a universal optical adapter with the above-described qualities to facilitate optical coupling of a Fiber Distributed-Data Interface (FDDI) style connector or an ESCON ™ style connector (ESCON is a trademark of IBM) with either an SC style connector (compatible with an SC ™ connector manufactured by NTT), an ST ™ style connector (ST is a trademark of AT and T), or an FC style connector.

In accordance with the above-described objects, the present invention provides a universal adapter for mating dissimilar plugs and receptacles of incompatible optical fiber connectors. The universal adapter comprises a housing having a pair of opposing side walls and upper and lower walls joining the side walls to form an open-ended compartment. A ferrule support bracket is mounted at one end of the housing for supporting conventional optical fiber alignment sleeves, and the other end of the housing is adapted to receive a duplex plug.

The adapter also comprises a back panel for coupling the duplex plug to a mating duplex connector. The back panel is shaped to cover the open end of the housing, and it further includes a pair of coupling elements mounted on the panel and projecting rearwardly therefrom, and a plurality of resilient anchoring tabs each having a central perforation, the tabs projecting rearwardly along the perimeter of the panel and conforming to the open end of the housing. The coupling elements may be any of the various types which are specified by industry standards and convention, and numerous back panels with different coupling elements may be provided to accommodate different fiber optic applications.

In operation, a pair of alignment sleeves is inserted into the support bracket, and the back panel is fastened to the open end of the housing by insertion therein. The alignment sleeves protrude from the support bracket into the respective coupling elements to insure proper alignment of optical fibers with the coupling elements. For attachment of the back panel, the anchoring tabs slidably gradually engage latch pins protruding interiorly from the side walls and upper wall of the housing. Initially, the anchoring tabs are biased atop the latch pins, but as insertion continues, the anchoring tabs capture the latch pins by the central perforations. The anchoring tabs then revert against the side walls and upper wall and the latch pins penetrate the central perforations to lock the back panel to the housing.

A conventional Fiber Distributed-Data Interface (FDDI) style connector or an ESCON ™ style connector may be mated with either an SC ™ style connector, an ST ™ style connector, an FC style connector, or any other type of optical connector by inserting one of the former in one end of the adapter and two of the latter in the other end.

BRIEF DESCRIPTION OF THE DRAWINGS

Other objects, features, and advantages of the present invention will become more apparent from the following detailed description of preferred embodiments and certain modifications thereof when taken together with the accompanying drawings in which.

DETAILED DESCRIPTION OF THE PREFERRED EMBODIMENT(S)

Figure 1:
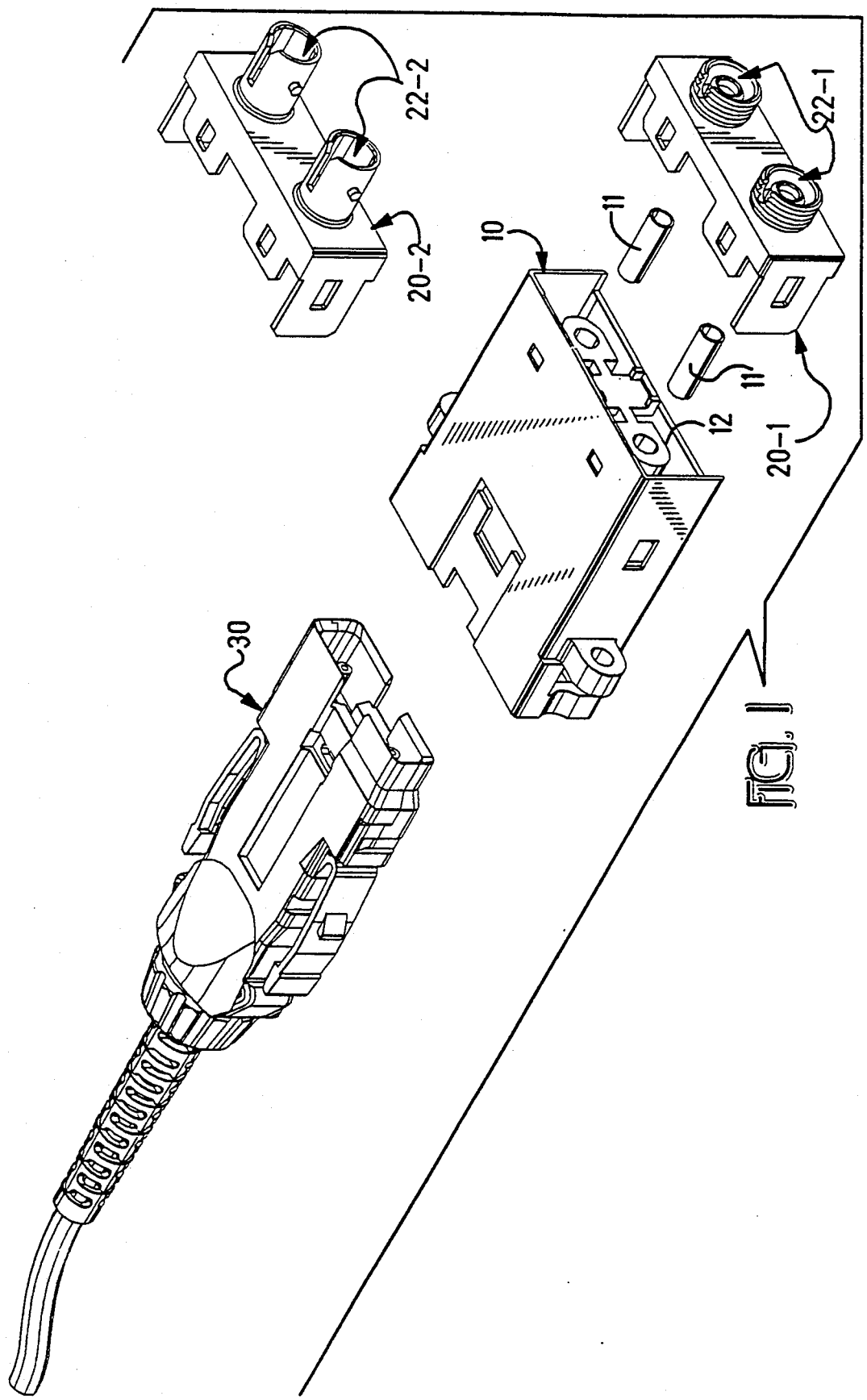
FIG. 1 is a perspective view of an exploded universal adapter according to the present invention showing the manner of attachment to a conventional FDDI style optical plug.

FIG. 1 is a perspective view of an unassembled universal adapter according to the present invention showing the manner of attachment to a conventional FDDI style optical plug 30.

The adapter generally includes an open-ended housing 10 which forms a protective dust cover for the fiber optic coupling. In addition, a variety of back panels 20-1, 20-2 . . . 20-n are provided. The back panels 20-1, 20-2 . . . 20-n are each formed with a different set of dual coupling elements 22-1, 22-2 . . . 22-n. It is a primary feature of the present invention that any selected one of back panels 20-1, 20-2 . . . 20-n may be slidably inserted and securely latched onto the face of housing 10. The interchangeable back panels 20-1, 20-2 . . . 20-n facilitate optical coupling of a Fiber Distributed-Data Interface (FDDI) style connector or an ESCON TM style connector with either an SC TM style connector, an ST TM style connector, an FC style connector, or any other type of optical connector.

The front of housing 10 is adapted to receive a conventional plug assembly 30. The plug assembly 30 may be fully inserted through the front of housing 10 until plug assembly 30 approaches the back of housing 10. A dual-fiber support bracket 12 is provided near the back of housing 10. When the plug assembly 30 is fully inserted, the shroud of the plug assembly 30 encloses the support bracket 12 and the interior of plug assembly 30 becomes substantially sealed by support bracket 12. The terminated optical fibers within plug assembly 30 are held in proper alignment by the support bracket. Alignment sleeves 11 are inserted into the opposite side of support bracket 12. Alignment sleeves 11 rearwardly invade the coupling elements 22-1, 22-2 . . . 22-n when the back panel 20 is attached to maintain alignment of the optical path throughout the adapter. Preferably, the adaptor housing includes a keying system at 15, such as the type disclosed in U.S. Pat. No. 5,117,476.

Figure 2:
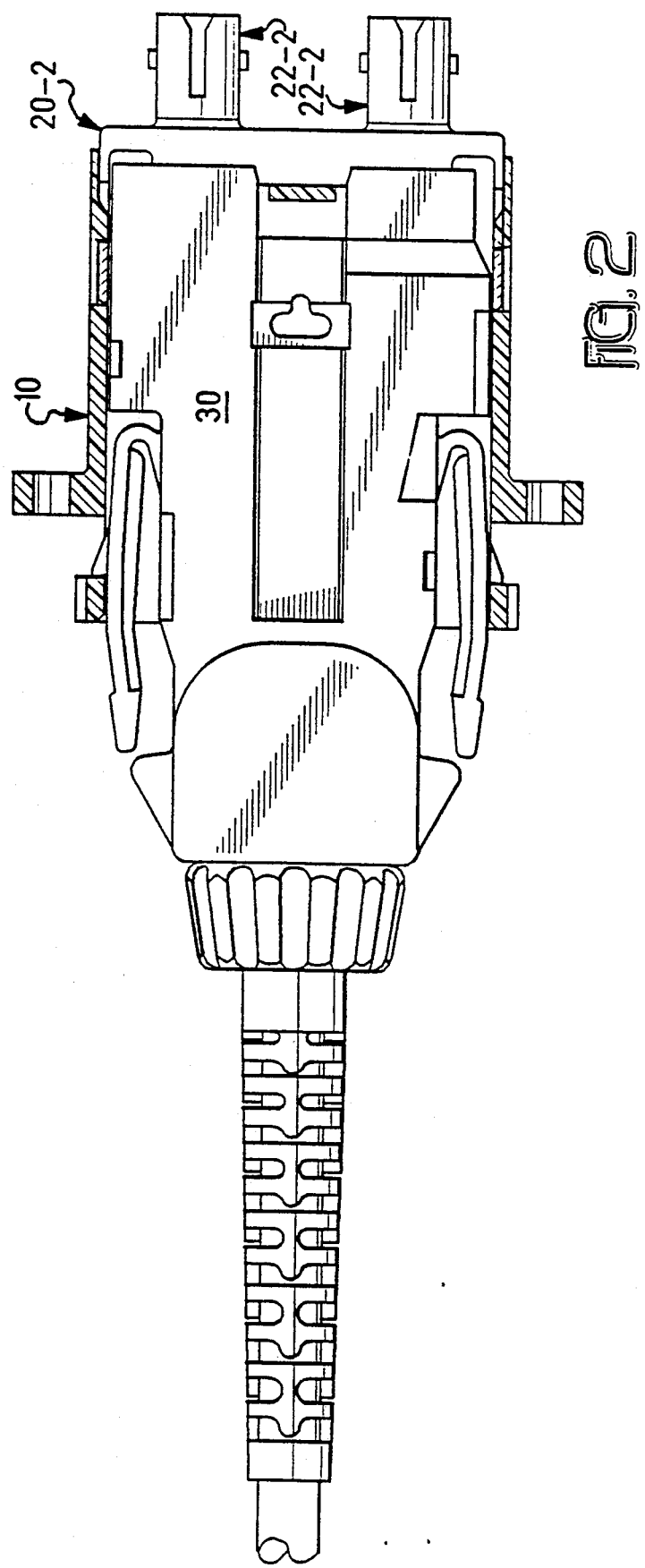
FIG. 2 is a top partially cut-away view of the assembled universal adapter of FIG. 1 mounted on the plug of FIG. 1.

FIG. 2 is a cut-away view showing the seating of plug assembly 30 within housing 10. The dual-fiber support bracket 12 (not shown in FIG. 2) is enclosed within the shroud of the fully inserted plug assembly 30. The terminated optical fibers within plug assembly 30 are held in alignment by the support bracket 12, and alignment sleeves 11 (not shown in FIG. 2) extend the alignment path through the coupling elements 22-1, 22-2 . . . 22-n of any of the respective back panels 20-1, 20-2 . . . 20-n which is selected to be locked onto the open end of housing 10. With the particular arrangement of components and the manner of latching back panels 20-1, 20-2 . . . 20-n to housing 10, an extremely precise alignment of the optical fibers can be achieved and maintained.

FIGS. 3–6 illustrate two particular examples of the back panels 20-1 and 20-2 which have different configurations of dual fiber optic coupling elements 22-1 and 22-2.

Figure 3:
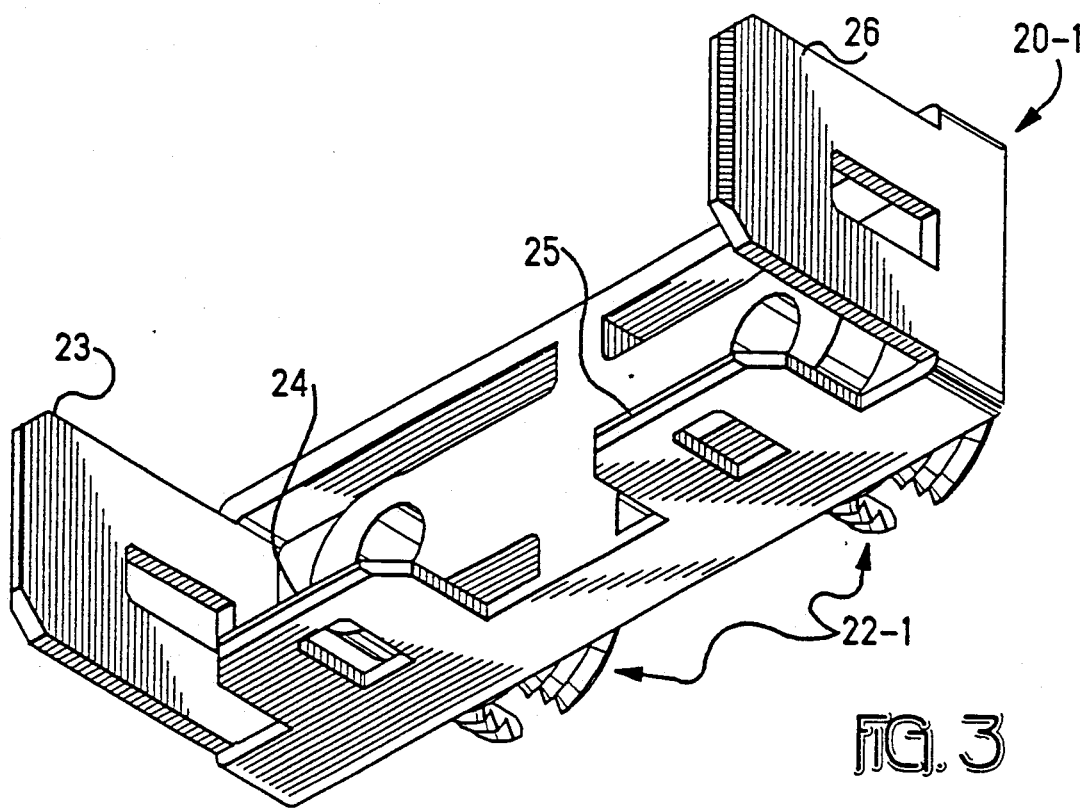
FIG. 3 shows a perspective view of a back panel 20-1 for the universal adapter having dual FC-style coupling assemblies.
Figure 4:
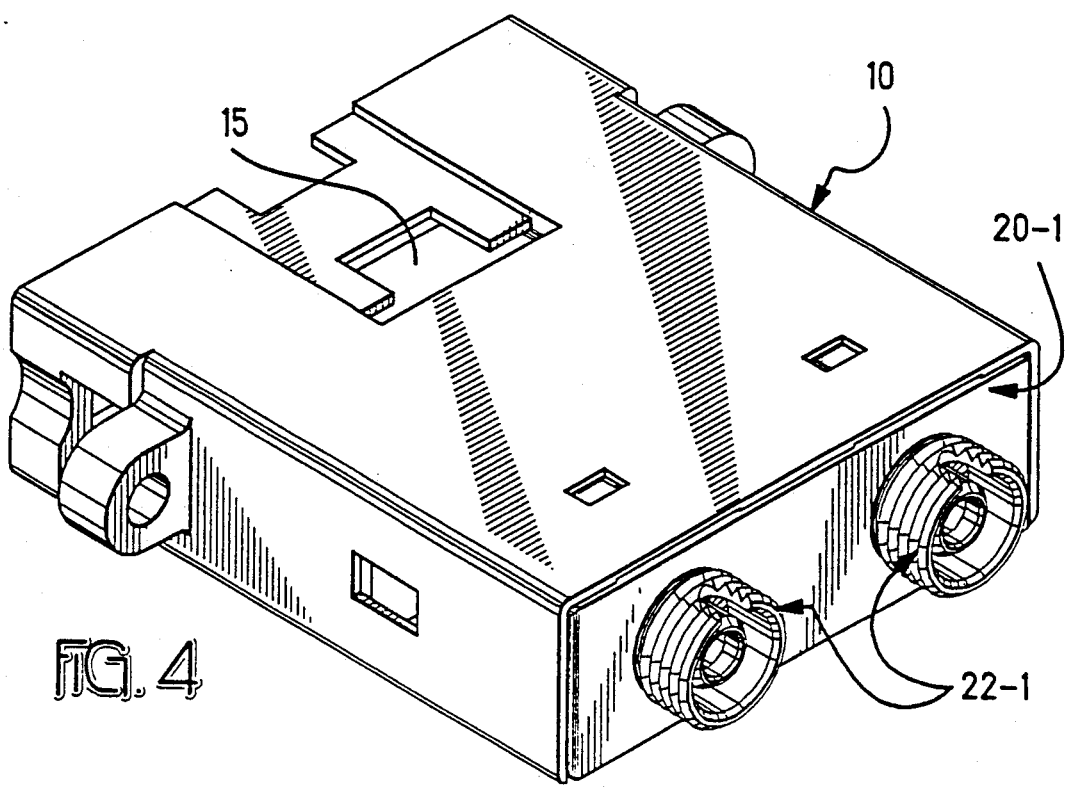
FIG. 4 shows a perspective view of the back panel 20-1 of FIG. 3 attached to the adapter housing 10.
Figure 5:
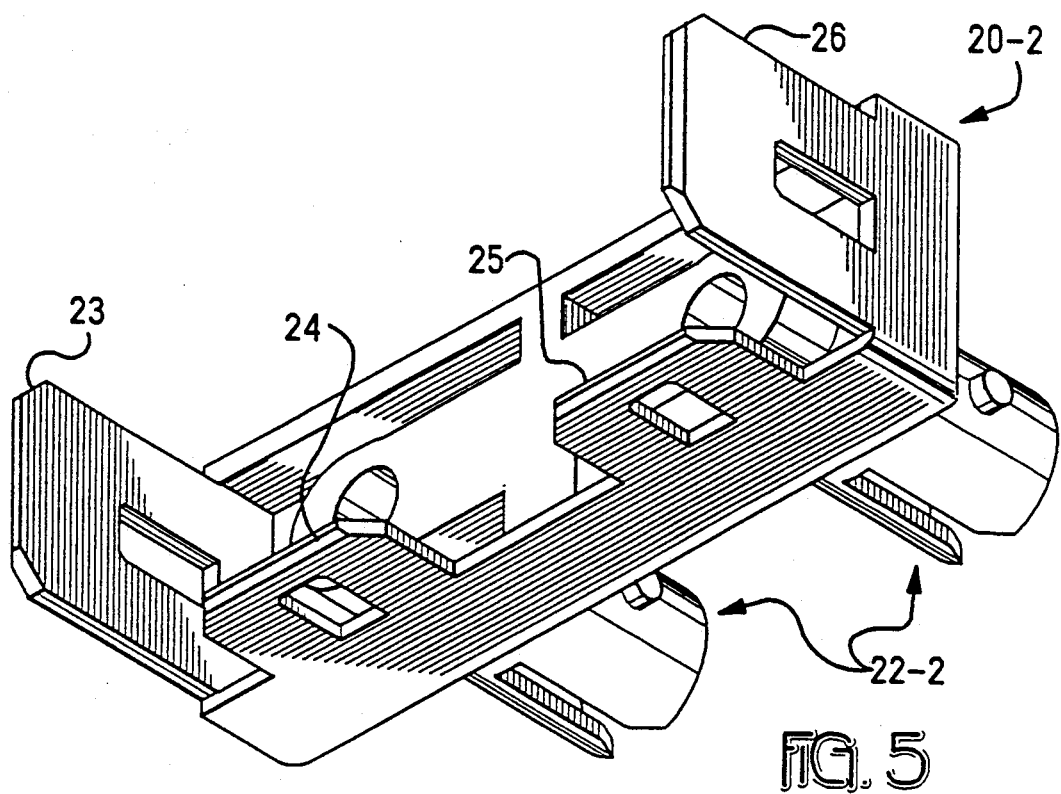
FIG. 5 shows a perspective view of an alternative back panel 20-2 for the universal adapter having dual ST-style coupling assemblies.
Figure 6:
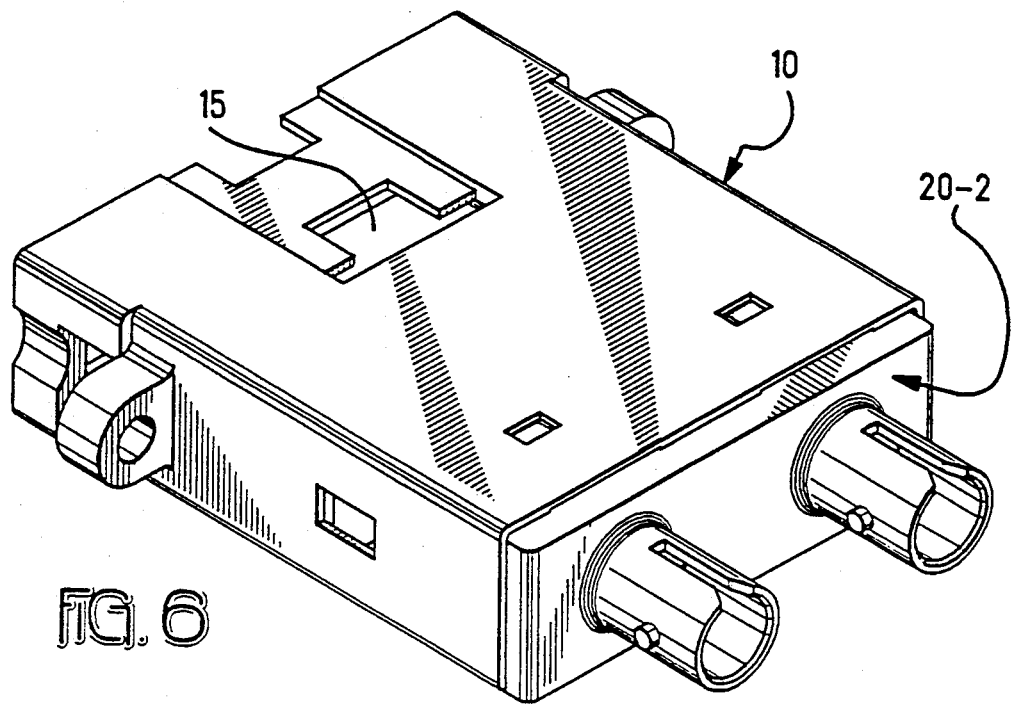
FIG. 6 shows a perspective view of the back panel 20-2 of FIG. 5 attached to the adapter housing 10.

As shown in FIGS. 3 and 4, conventional FC-style coupling elements 22-1 are provided. In addition, as shown in FIGS. 5 and 6, conventional ST-style coupling elements 22-2 are provided. Alternatively, SC-style or any other variety of coupling elements may be provided as desired.

Referring to FIGS. 3 and 5, regardless of the type of coupling elements, the back panels 20-1, 20-2 . . . 20-n are all formed with a series of rearwardly extending tabs 23–26, including opposing side tabs 23 and 26 and a pair of spaced upper tabs 24 and 25. The details of the arrangement of tabs 23–26 is more clearly shown in FIGS. 7 and 8. Both upper tabs 24 and 25 as well as side tabs 23 and 26 extend a short distance. Although the side tabs 22 and 23 are shown to extend a short distance further than the upper tabs 22 and 25, there is no functional preference in the relative length of the tabs 23–26.

The width of side tabs 23 and 26 generally conforms to the interior of the open end of housing 10. This way, when back panel 20 is inserted within housing 10, side tabs 23 and 26 serve to automatically align the two components. The tips of side tabs 23 and 26 are preferably tapered to ease insertion.

All of tabs 23–26 are provided with a centrally positioned rectangular hole. The hole increases the pliancy of the tabs 23–26 and, at the same time, provides a locking mechanism which cooperates with housing 10.

The side tabs 23 and 26 provide the primary anchoring force within housing 10. Upper tabs 24 and 25 provide additional anchoring force and greatly improve pivotal restraint.

Figure 7:
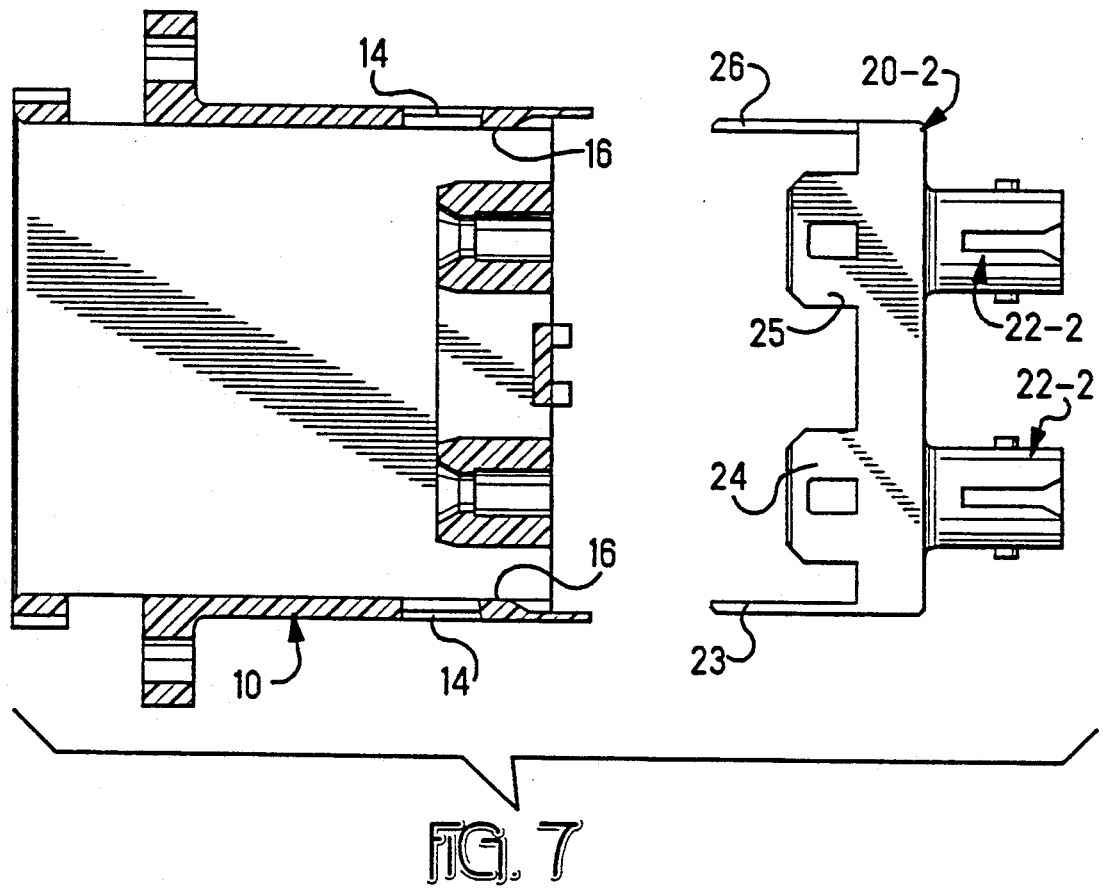
FIGS. 7 and 8 show a top cut-away view and a side cut-away view, respectively, of a housing 10 and generic back panel 20 according to the present invention.
Figure 8:
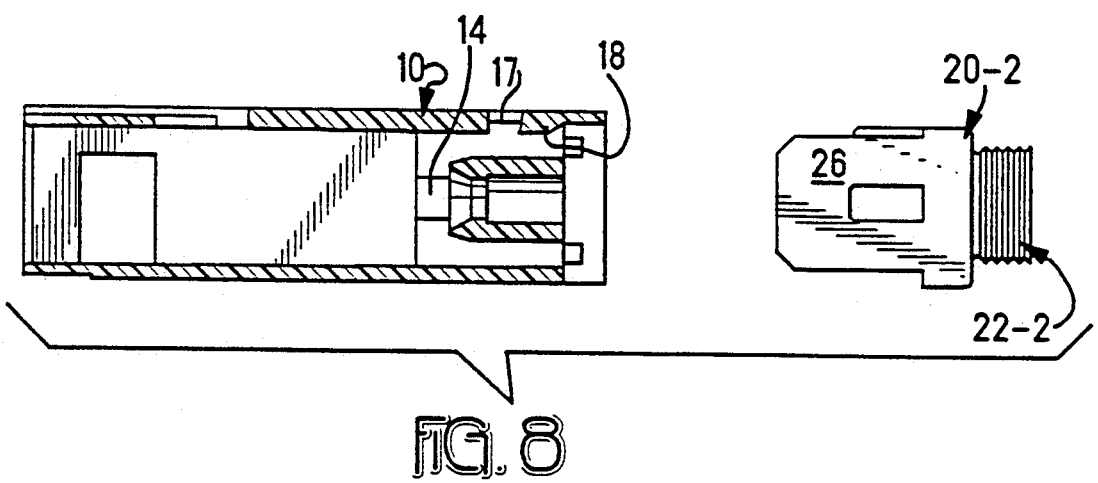

The cooperating locking mechanism of housing 10 is described in more detail with regard to FIGS. 7 and 8.

As shown in FIG. 7, the opposing side walls of housing 10 are provided with holes 14 at positions that generally correspond to the central holes within side tabs 23 and 26 of back panel 20. Likewise, as shown in FIG. 8, the upper wall of housing 10 is provided with a pair of spaced holes 17 at positions which generally correspond to the central holes in the upper tabs 24 and 25 of each back panel 20.

Further, as shown in FIG. 7, housing 10 is formed with an opposing pair of interior protrusions 16. Preferably, the protrusions 16 are generally ramp-shaped with a plateau terminating sharply forwardly of side holes 14. Protrusions 16 terminate to form 90° edges precipitating into respective holes 14. Two similar protrusions 18 are provided forwardly of upper holes 17. Protrusions 18 are likewise ramped surfaces ending at plateaus, which in turn sharply terminate at 90° edges precipitating into respective holes 17.

Figure 9:
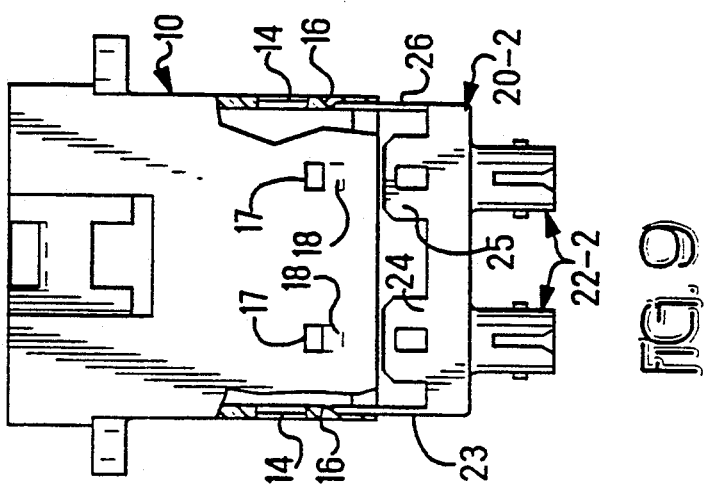
FIGS. 9–11 are sequential drawings illustrating the insertion sequence of back panel 20 within housing 10 in accordance with the present invention.
Figure 10:
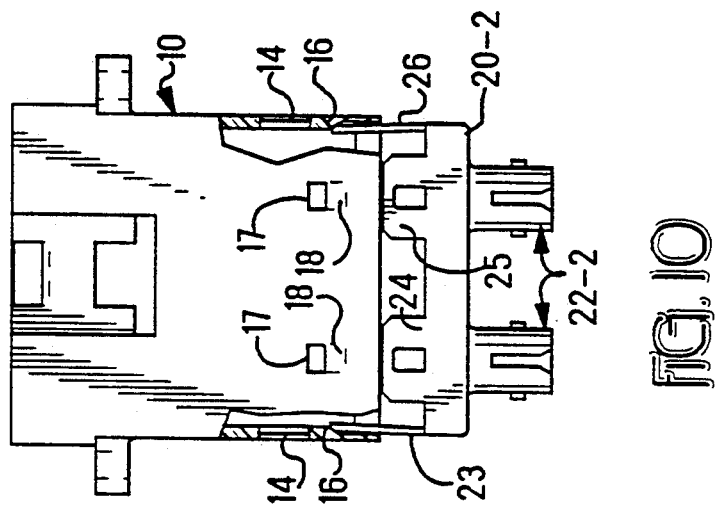
Figure 11:
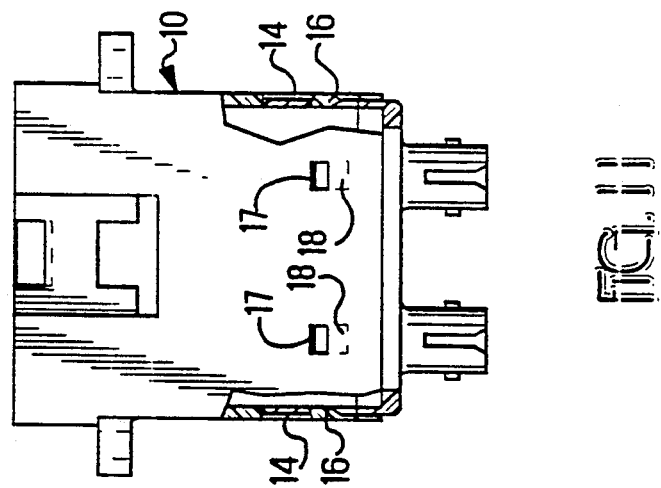

The insertion sequence of back panel 20 within housing 10 will now be described with reference to FIGS. 9–11. As shown in FIG. 9, side tabs 23 and 26 may be conveniently aligned and inserted by hand within the interior side walls of housing 10. Once in alignment, insertion may proceed as shown in FIG. 10. Side tabs 23 and 26 will abut the ramped surfaces of protrusions 16, and tabs 23 and 26 will be biased inwardly of housing 10, thereby generating a gradually increasing insertion resistance. The resistance is very small due to the resiliency of tabs 23 and 26 (the resiliency owing to the centrally positioned hole), and a very small insertion force is required.

Meanwhile, as tabs 23 and 26 ride upward along the ramped surfaces of protrusions 16, upper tabs 24 and 25 begin to engage respective protrusions 18. As insertion continues, upper tabs 24 and 25 progress upward over corresponding protrusions 18 and the ramped surfaces bias tabs 24 and 25 inward of housing 10. Insertion proceeds until resilient tabs 23 and 26 loop around and clasp the respective protrusions 16. The 90° angular edges of protrusions 16 provide a locking engagement with tabs 23 and 26. At the same time, upper tabs 24 and 25 loop around and clasp respective protrusions 18 to provide a similar locking engagement. The completed assembly is shown in FIG. 11.

Back panels 20-1, 20-2 . . . 20-n can be removed and/or interchanged simply by inserting a small screw driver within the holes 14 and 17 in the side walls and upper wall of housing 10 and biasing the tabs 23–26 inwardly of the housing such that tabs 23–26 clear protrusions 16 and 18. The back panel 20 can then be withdrawn from housing 10.

Having now fully set forth the preferred embodiments and certain modifications of the concept underlying the present invention, various other embodiments as well as certain variations and modifications of the embodiments herein described will obviously occur to those skilled in the art upon becoming familiar with said underlying concept. It is to be understood, therefore, that within the scope of the appended claims, the invention may be practiced otherwise than as specifically set forth herein.

We claim:

1. A universal adapter for mating dissimilar optical fiber connectors, said adapter comprising:
 a housing comprising a pair of opposing side walls and upper and lower walls joining said side walls to form an open-ended compartment, said housing further including,
  a first end adapted for insertion of a duplex fiber-optic plug assembly, and
  a plurality of latch pins protruding from said side walls and upper wall interiorly of said housing; and
 a back panel shaped to cover a second end of said housing and fastenable thereto for coupling a duplex plug assembly seated in said housing to a dissimilar connector, said back panel further comprising,
  a pair of forwardly protruding coupling elements adapted for mating with said dissimilar connector, and
  a plurality of resilient anchoring tabs projecting rearwardly from said back panel and each having a central perforation, said anchoring tabs conforming to said second end of said housing for self-aligning the back panel with said housing during insertion therein;
 whereby during insertion of said back panel in said housing, said anchoring tabs are biased over said latch pins until said anchoring tabs capture said latch pins within the central perforations, said anchoring tabs thereupon clasping said latch pins on said side walls and upper wall to lock said back panel against said housing.

2. The universal adapter according to claim 1, wherein said housing is formed with a hole proximate each of said latch pins to allow external biasing of the respective anchoring tabs for unlocking said back panel from said housing.

3. The universal adapter according to claim 1, wherein said housing further comprises four latch pins protruding interiorly of said housing including two latch pins protruding from said upper wall and a latch pin protruding from each of said side walls, and
 said back panel further comprises four resilient anchoring tabs corresponding to the respective latch pins.

4. The universal adapter according to claim 1, wherein said latch pins each comprise a ramped surface contiguous with a segmental plateau.

5. The universal adapter according to claim 2, wherein said latch pins each comprise a ramped surface contiguous with a segmental plateau, said plateau precipitating into one of said holes.

6. The universal adapter according to claim 5, whereby said anchoring tabs are biased up the ramped surface of said latch pins during insertion and atop the plateau until said anchoring tabs capture said latch pins within the central perforations.

7. The universal optical fiber adapter according to claim 6, further comprising a pair of alignment sleeves, and said housing further comprising a support bracket located interiorly of the second end for carrying said alignment sleeves, whereby said alignment sleeves rearwardly invade the coupling elements when said back panel is attached to said housing to insure a precision duplex optical path therebetween.

* * * * *